(12) United States Patent
Balamane et al.

(10) Patent No.: US 8,486,289 B2
(45) Date of Patent: *Jul. 16, 2013

(54) SYSTEM, METHOD AND APPARATUS FOR FABRICATING A C-APERTURE OR E-ANTENNA PLASMONIC NEAR FIELD SOURCE FOR THERMAL ASSISTED RECORDING APPLICATIONS

(75) Inventors: Hamid Balamane, Portola Valley, CA (US); Thomas Dudley Boone, San Jose, CA (US); Jordan Asher Katine, Mountain View, CA (US); Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/306,582

(22) Filed: Nov. 29, 2011

(65) Prior Publication Data

US 2012/0070784 A1    Mar. 22, 2012

Related U.S. Application Data

(63) Continuation of application No. 12/345,715, filed on Dec. 30, 2008, now Pat. No. 8,092,704.

(51) Int. Cl.
*B44C 1/22*      (2006.01)
*B23P 15/00*     (2006.01)

(52) U.S. Cl.
USPC .............................. 216/57; 216/39

(58) Field of Classification Search
USPC .............................................. 216/57
See application file for complete search history.

(56) References Cited

U.S. PATENT DOCUMENTS

| 4,268,951 | A | * | 5/1981 | Elliott et al. ................. 438/289 |
| 5,260,921 | A | | 11/1993 | Shibuya et al. |
| 5,344,786 | A | * | 9/1994 | Bayraktaroglu ............. 438/317 |
| 5,583,727 | A | | 12/1996 | Parkin |
| 5,696,372 | A | | 12/1997 | Grober et al. |
| 5,703,840 | A | | 12/1997 | Kazama |

(Continued)

FOREIGN PATENT DOCUMENTS

| CN | 101000770 A | 7/2007 |
| JP | 2006202449 A | 8/2006 |
| JP | 2006351091 | 12/2006 |
| JP | 2007293972 | 11/2007 |

OTHER PUBLICATIONS

Chen, Yu-Chieh, et al., "Double-Corrugated C-Shaped Aperture for Near-Field Recording", Japanese Journal of Applied Physics, vol. 45, No. 2B, 2006 American Institute of Physics, 3 pages.

(Continued)

*Primary Examiner* — Binh X Tran
*Assistant Examiner* — Thomas Pham (57) ABSTRACT

A method of fabricating a c-aperture or E-antenna plasmonic near field source for thermal assisted recording applications in hard disk drives is disclosed. A c-aperture or E-antenna is built for recording head applications. The technique employs e-beam lithography, partial reactive ion etching and metal refill to build the c-apertures. This process strategy has the advantage over other techniques in the self-alignment of the c-aperture notch to the c-aperture internal diameter, the small number of process steps required, and the precise and consistent shape of the c-aperture notch itself.

16 Claims, 11 Drawing Sheets

U.S. PATENT DOCUMENTS

| | | | |
|---|---|---|---|
| 6,009,051 A | 12/1999 | Kazama | |
| 6,236,514 B1 | 5/2001 | Sato | |
| 6,303,402 B1 | 10/2001 | Hatano et al. | |
| 6,429,419 B1 | 8/2002 | Mitsuoka et al. | |
| 6,445,667 B1 | 9/2002 | Bernacki et al. | |
| 6,657,926 B2 | 12/2003 | Burroughs | |
| 6,724,718 B1 | 4/2004 | Shinohara et al. | |
| 6,768,556 B1 | 7/2004 | Matsumoto et al. | |
| 6,771,445 B1 | 8/2004 | Hamann et al. | |
| 6,771,589 B2 | 8/2004 | Ueyanagi et al. | |
| 6,773,764 B2 | 8/2004 | Marinero et al. | |
| 6,839,191 B2 | 1/2005 | Sugiura et al. | |
| 6,930,053 B2 * | 8/2005 | Mori et al. | 438/745 |
| 6,944,101 B2 | 9/2005 | Johns et al. | |
| 6,947,634 B2 | 9/2005 | Tanaka et al. | |
| 6,970,307 B2 | 11/2005 | Sugiura et al. | |
| 6,982,844 B2 | 1/2006 | Rettner et al. | |
| 6,999,384 B2 * | 2/2006 | Stancil et al. | 369/13.32 |
| 7,042,810 B2 | 5/2006 | Akiyama et al. | |
| 7,095,767 B1 | 8/2006 | Thornton et al. | |
| 7,250,598 B2 | 7/2007 | Hollingsworth et al. | |
| 7,272,102 B2 | 9/2007 | Challener | |
| 7,307,923 B2 | 12/2007 | Miyanishi et al. | |
| 7,359,599 B2 | 4/2008 | Matsumoto | |
| 7,379,415 B2 | 5/2008 | Song et al. | |
| 7,538,978 B2 * | 5/2009 | Sato et al. | 360/128 |
| 7,649,677 B2 | 1/2010 | Jin et al. | |
| 7,652,954 B2 | 1/2010 | Fontana, Jr. et al. | |
| 7,880,996 B2 | 2/2011 | Stipe | |
| 2002/0163862 A1 | 11/2002 | Ohmori | |
| 2004/0062152 A1 | 4/2004 | Stancil et al. | |
| 2005/0031278 A1 | 2/2005 | Shi et al. | |
| 2006/0018211 A1 | 1/2006 | Ueyanagi et al. | |
| 2006/0182393 A1 | 8/2006 | Sendur et al. | |
| 2006/0187564 A1 | 8/2006 | Sato et al. | |
| 2006/0202449 A1 | 9/2006 | Yokota et al. | |
| 2007/0041119 A1 | 2/2007 | Matsumoto et al. | |
| 2007/0058686 A1 | 3/2007 | Capasso et al. | |
| 2007/0064544 A1 | 3/2007 | Okamoto | |
| 2007/0069429 A1 | 3/2007 | Albrecht et al. | |
| 2007/0081426 A1 | 4/2007 | Lee et al. | |
| 2007/0081427 A1 | 4/2007 | Suh et al. | |
| 2007/0087122 A1 | 4/2007 | Hashimoto | |
| 2007/0096854 A1 | 5/2007 | Matsumoto et al. | |
| 2007/0230010 A1 | 10/2007 | Jin et al. | |
| 2007/0230047 A1 | 10/2007 | Jin et al. | |
| 2007/0286031 A1 | 12/2007 | Matsumoto | |
| 2008/0055343 A1 | 3/2008 | Chao et al. | |
| 2008/0080039 A1 | 4/2008 | Hongo et al. | |
| 2008/0107377 A1 | 5/2008 | Cho et al. | |
| 2008/0149809 A1 | 6/2008 | Hamann et al. | |
| 2008/0151360 A1 | 6/2008 | Stipe | |
| 2008/0151431 A1 | 6/2008 | Tanaka et al. | |
| 2008/0181560 A1 | 7/2008 | Suh et al. | |
| 2009/0258186 A1 | 10/2009 | Fontana, Jr. et al. | |
| 2010/0128578 A1 | 5/2010 | Kato et al. | |
| 2010/0165499 A1 | 7/2010 | Stipe | |
| 2010/0165822 A1 | 7/2010 | Balamane et al. | |
| 2011/0096431 A1 | 4/2011 | Hellwig et al. | |

OTHER PUBLICATIONS

Cubukcu, Ertugrul, et al., "Plasmonic Laser Antenna", Applied Physics Letters 89, 093120, 2006, 3 pages.

Schlesinger, T.E., et al., "A Integrated Read/Write Head for Hybrid Recording", Japanese Journal of Applied Physics, vol. 41, Part I, No. 3B, Mar. 2002 The Japan Society of Applied Physics, 4 pages.

Sendur, Kursat et al., "Ridge Waveguide as a Near Field Aperture for High Density Data Storage", Journal of Applied Physics, vol. 96, No. 5, Sep. 1, 2004, 9 pages.

Shi, Xiaolei et al., "Design of a C Aperture to Achieve /10 Resolution and Resonant Transmission", Journal of the Optical Society of America B, vol. 21, No. 7, Jul. 2004 Optical Society of America, 13 pages.

Sun, Liying, et al., "Topology Visualization of the Optical Power Flow through a Novel C-Shaped Nano-Aperture", IEEE Visualization 2004, Oct. 10-15, Austin, Texas, USA, 8 pages.

Xu, Xianfan, et al., "Design, Fabrication, and Characterization of Nanometer-Scale Ridged Aperture Optical Antennae", Proc. of SPIE vol. 6106, 2006, 12 pages.

Matted, J.A., et al., Spectral Analysis of Strongly Enhanced Visible Light Transmission through Single C-Shaped Nanoapertures, Appl. Phys. Ltt. 85, 648, http://link.aip.org/link/?APPLAB/851648/1, 2004.

\* cited by examiner

SYSTEM, METHOD AND APPARATUS FOR FABRICATING A C-APERTURE OR E-ANTENNA PLASMONIC NEAR FIELD SOURCE FOR THERMAL ASSISTED RECORDING APPLICATIONS

CROSS-REFERENCE TO RELATED APPLICATION(S)

This application is a continuation of U.S. patent application Ser. No. 12/345,715, filed Dec. 30, 2008, now U.S. Pat. No. 8,092,704, and is incorporated herein by reference in its entirety.

BACKGROUND OF THE INVENTION

1. Technical Field

The present invention relates in general to thermal assisted recording (TAR) applications and, in particular, to an improved system, method and apparatus for fabricating a c-aperture or E-antenna plasmonic near field source for thermal assisted recording applications in hard disk drives.

2. Description of the Related Art

In magnetic recording disk drives, the magnetic material (or media) for the recording layer on the disk is chosen to have sufficient coercivity such that the magnetized data bits are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) may be required. However, increasing $K_u$ also increases the short-time switching field, $H_0$, which is the field required to reverse the magnetization direction, which for most magnetic materials is somewhat greater than the coercivity or coercive field measured on much longer time-scales. However, $H_0$ cannot exceed the write field capability of the recording head, which currently is limited to about 15 kOe for perpendicular recording.

Since it is known that the coercivity of the magnetic material of the recording layer is temperature dependent, one proposed solution to the thermal stability problem is thermally-assisted recording (TAR), wherein the magnetic material is heated locally to near or above its Curie temperature during writing to lower the coercivity enough for writing to occur, but where the coercivity/anisotropy is high enough for thermal stability of the recorded bits at the ambient temperature of the disk drive (i.e., the normal operating or "room" temperature). Several TAR approaches have been proposed, primarily for the more conventional longitudinal or horizontal recording, wherein the magnetizations of the recorded bits are oriented generally in-the-plane of the recording layer. However, TAR is also applicable for perpendicular recording, wherein the magnetizations of the recorded bits are oriented generally out-of-the-plane of the recording layer. TAR is also usable with patterned media.

In TAR, it is important to avoid heating data tracks adjacent to the data track where data is to be written because the stray magnetic field from the write head can erase data previously recorded in the adjacent tracks. Also, even in the absence of a magnetic field, heating of adjacent data tracks accelerates the thermal decay over that at ambient temperature and thus data loss may occur. A proposed solution for this adjacent-track interference problem is the use of an optical channel with a small aperture that directs heat from a radiation source, such as a laser, to heat just the data track where data is to be written. This type of TAR disk drive is described in U.S. Pat. No. 5,583,727 and U.S. Pat. No. 6,982,844.

In conventional (non-TAR) disk drives, each read/write head is located on an air-bearing slider that is maintained in close proximity to its associated disk surface as the disks rotate. The films making up the read and write heads are deposited on a wafer containing a large number, e.g., 40,000, of rectangular regions arranged in rows, with each region ultimately becoming an individual slider. After formation of the read and write heads at the wafer level, the wafer is cut into rows and the rows cut into individual sliders. The sliders are then "lapped" in a plane perpendicular to the wafer surface, with this plane becoming the slider's air-bearing surface (ABS). However, for sliders used for TAR disk drives, the only proposed methods for forming an optical channel and/or aperture structure have been to fabricate the optical channel and/or aperture structure on the slider at the row level, i.e., after the wafer has been cut into rows, or at the individual slider level. These are costly and time-consuming methods.

TAR requires small focused light spots that are much smaller than the diffraction limit of the light source. Therefore, regular optical components are not viable for these types of applications. Nanoscale near field plasmonic sources are being considered for use in TAR for fabricating the required optical structures. One of the most promising optical structures is the c-aperture, which can be thought of as an E-antenna. To clarify, the dielectric aperture in this structure looks like the letter "c", while the metal surrounding that dielectric forms an antenna in the shape of a capital letter "E". An improved wafer-level process for forming optical channels and aperture structures on air-bearing sliders for use in TAR disk drives would be desirable.

SUMMARY OF THE INVENTION

Embodiments of a system, method, and apparatus for fabricating a c-aperture or E-antenna plasmonic near field source for thermal assisted recording applications in hard disk drives are disclosed. The invention comprises a technique for building a c-aperture in a manner that is consistent with and appropriate for recording head applications. The technique employs e-beam lithography, partial reactive ion etching (RIE) and metal refill to build the c-apertures. This process strategy has the advantage over other techniques in the self-alignment of the c-aperture notch to the c-aperture internal diameter, the small number of process steps required, and the precise and consistent shape of the c-aperture notch itself.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Referring to FIGS. 1-17, embodiments of a system, method and apparatus for fabricating a c-aperture or E-antenna plasmonic near field source for thermal assisted recording applications in hard disk drives are disclosed.

Figure 14:
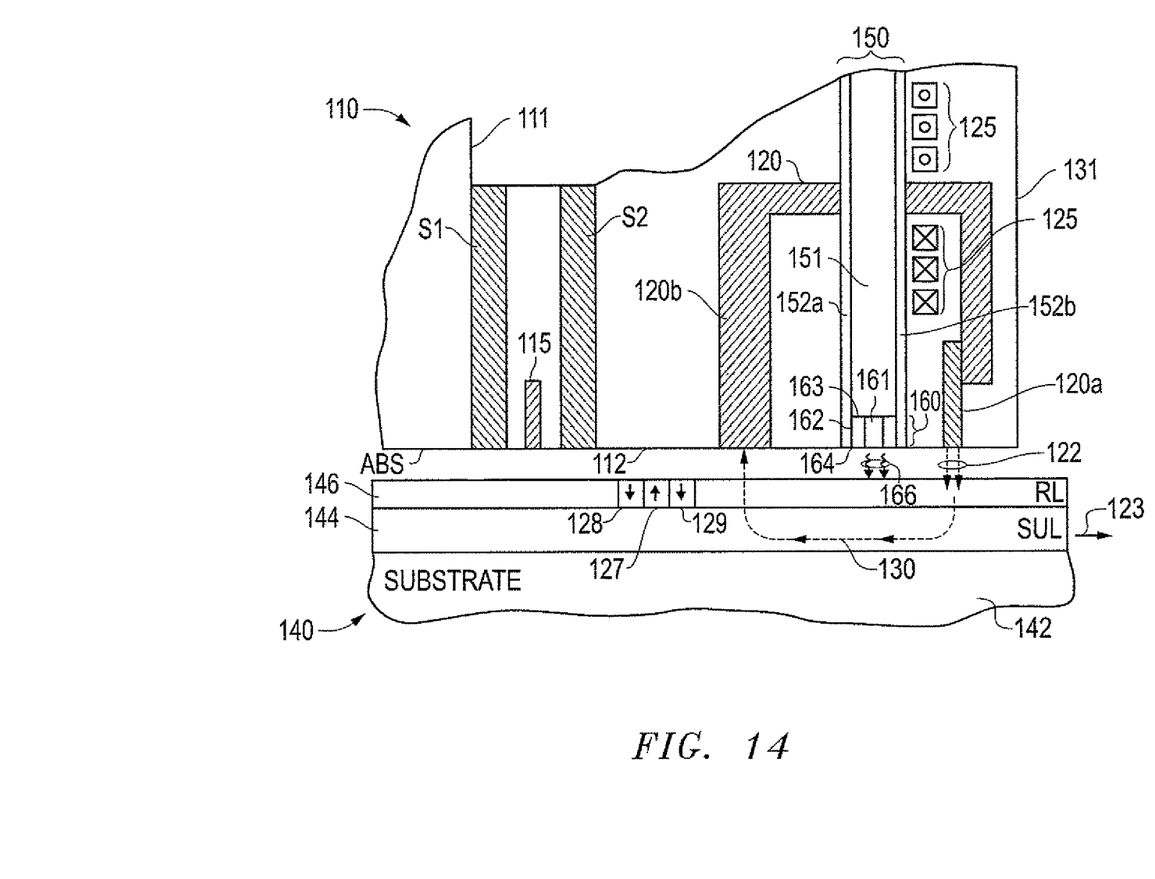
FIG. 14 is a sectional view through one embodiment of a portion of an air-bearing slider and associated perpendicular magnetic recording disk for a TAR disk drive that uses an optical channel and aperture structure to direct heat to the recording layer of the disk in accordance with the invention.

For example, FIG. 14 is a sectional view through a portion of an air-bearing slider 110 and associated perpendicular magnetic recording disk for a TAR disk drive of the type that uses an optical channel for directing heat to the disk. The disk 140 includes a substrate 142, an optional "soft" or relatively low-coercivity magnetically permeable underlayer (SUL) 144, and a perpendicular magnetic recording layer (RL) 146. The SUL 144 is not required for a TAR disk drive but if used is typically any alloy material suitable as the magnetically-permeable flux-return path, such as NiFe, FeAlSi, FeTaN, FeN, CoFeB and CoZrNb. The RL 146 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The RL 146 may also be an $L1_0$ ordered alloy such as FePt or FeNiPt. The disk 140 would also typically include a protective overcoat (not shown) over the RL 146.

The slider 110 has a trailing surface 111 and an air-bearing surface (ABS) surface 112 oriented generally perpendicular to trailing surface 111. The slider 110 is typically formed of a composite material, such as a composite of alumina/titanium-carbide ($Al_2O_3$/TiC), and supports the read and write elements typically formed as a series of thin films and structures on its trailing surface 111. The surface 111 is called the trailing surface because of the direction 123 of the disk 140 relative to slider 110. The ABS 112 is the recording-layer-facing surface of the slider that faces the disk and is shown without the thin protective overcoat typically present in an actual slider. The recording-layer-facing surface or ABS shall mean the surface of the slider that is covered with a thin protective overcoat, the actual outer surface of the slider if there is no overcoat, or the outer surface of the overcoat. FIG. 14 is not drawn to scale because of the difficulty in showing the very small features.

The slider 110 supports a conventional magnetoresistive read head 115 located between shields S1 and S2, and a conventional perpendicular write head that includes a magnetic yoke 120 with a write pole 120a, a flux return pole 120b, and an electrically conductive coil 125. The write pole 120a is formed of conventional high-moment material, such as a FeCoNi alloy. The write coil 125 is shown as wrapped around yoke 120 with the electrical current directions being shown as into the paper by the coil cross-sections marked with an "X" and out of the paper by the coil cross-sections marked with a solid circle. When write-current pulses are directed through coil 125, the write pole 120a directs magnetic flux, represented by arrow 122, to the RL 146. The dashed line 130 with arrows show the flux return path through the SUL 144 back to the return pole 120b. As known in the art, the coil may also be of the helical type.

Because the disk drive is a TAR disk drive, the slider 110 also includes a waveguide or optical channel 150 with an aperture structure 160 near the ABS 112. The optical channel 150 with aperture structure 160 is depicted in FIG. 14 as extending through the yoke 120 and being located between the write pole 120a and the return pole 120b. However, for the method of fabrication of this invention, the optical channel 150 with aperture structure 160 may be fabricated on the trailing surface 111 at other locations, such as between shield S2 and return pole 120b, or between the write pole 120a and the outer face 131 of slider 110. The optical channel 150 is formed of a core material 151 such as a high-index-of-refraction dielectric material that is transmissive to radiation at the wavelength of the laser radiation source. Typical radiation-transmissive materials include $TiO_2$ and $Ta_2O_5$. The radiation-transmissive material 151 is surrounded by cladding material 152a, 152b that has a lower refractive index than the optical channel material 151 and is transmissive to radiation at the wavelength of the laser radiation source. Typical cladding materials include $SiO_2$ and $Al_2O_3$. The optical channel 150 directs radiation to the aperture structure 160. Aperture structure 160 includes the opening or aperture 161 that is filled with radiation-transmissive material and that is surrounded by metal layer 162. Preferably the aperture 161 is filled with a low index of refraction material such as $SiO_2$ or $Al_2O_3$. The aperture structure 160 has a radiation entrance face 163 and a radiation exit face 164 that are generally parallel to one another and to the ABS. The aperture structure 160 directs radiation, as represented by wavy arrow 166, to the RL 146 to heat the RL nearly to or above the Curie temperature of the material making up the RL. During writing, the RL 146 moves relative to the slider 110 in the direction shown by arrow 123. In TAR, heating from radiation through aperture structure 160 temporarily lowers the coercivity $H_c$ of the RL 146 so that the magnetic regions may be oriented by the write field from write pole 120a. The magnetic regions become oriented by the write field if the write field $H_w$ is greater than $H_c$. After a region of the RL in the data track has been exposed to the write field from the write pole 120a and heat from the aperture structure 160 it becomes written or recorded when it cools to below the Curie temperature. The transitions between recorded regions (such as previously recorded regions 127, 128 and 129) represent written data "bits" that can be read by the read head 115.

If the radiation source is light from a CD-RW type laser diode, then the wavelength is approximately 780 nm. The laser diode may be located on the slider 110. Alternatively, laser radiation may be delivered from a source off the slider through an optical fiber or waveguide. The aperture 161 at radiation exit face 164 acts as a near-field optical transducer. The aperture 161 is subwavelength-sized, i.e., the dimension of its smallest feature is less than the wavelength of the incident laser radiation and preferably less than one-half the wavelength of the laser radiation.

Figure 15:
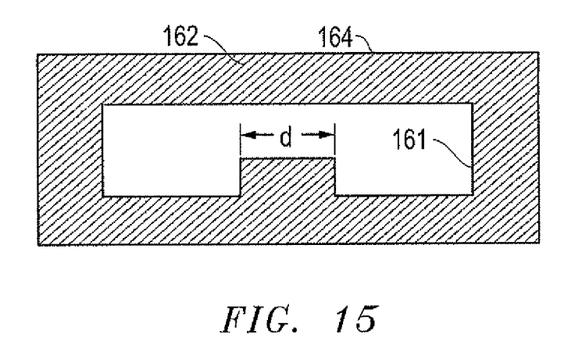
FIG. 15 is an illustration of one embodiment of the radiation exit face of an aperture structure having a generally c-shaped aperture with a characteristic dimension "d," and is constructed in accordance with the invention.

FIG. 15 is a view of radiation exit face 164 with aperture 161 surrounded by metal 162. The aperture 161 shown in FIG. 15 is a "C"-shaped aperture with a characteristic dimension "d." The near-field spot size is determined by the characteristic dimension "d," which is the width of the ridge of the aperture. The resonant wavelength depends on the characteristic dimension of the aperture as well as the electrical properties and thickness of the thin film surrounding the aperture. This is discussed by J. A. Matteo et. al., *Applied Physics Letters*, Volume 85(4), pp. 648-650 (2004) for a C-shaped aperture.

For sliders used in conventional (non-TAR) disk drives, the films making up the read and write heads are deposited on a wafer containing a large number, e.g., 40,000, of rectangular regions arranged in rows, with each region ultimately becoming an individual slider and the wafer surface of each region becoming the trailing surface of the individual slider, like trailing surface 111 of slider 110. After formation of the read and write heads at the wafer level, the wafer is cut into rows and the rows cut into individual sliders. The sliders are then "lapped" in a plane perpendicular to the wafer surface, with this plane becoming the slider ABS. However, for sliders used for TAR disk drives, the only proposed methods for forming the aperture structures have been to fabricate the aperture structure on the slider at the row level, i.e., after the wafer has been cut into rows, or at the individual slider level. These are costly and time-consuming methods.

In the present invention, the aperture structures, as well as the optical channels, are fabricated at the wafer level. Thus, after the wafer is cut into rows and the rows into the individual sliders, each slider contains not only the read and write heads, but the aperture structure and optical channel required for TAR, like the slider shown in FIG. 14.

Figure 16:
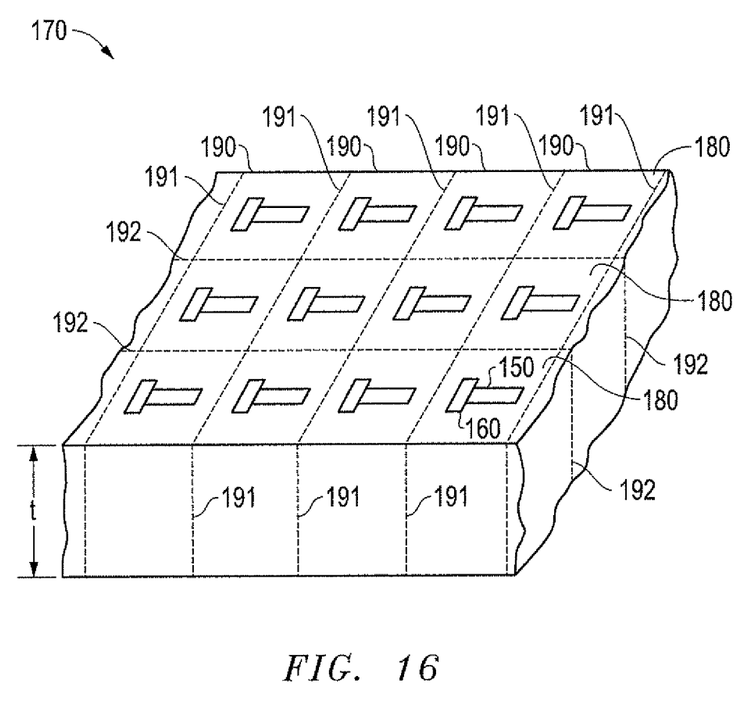
FIG. 16 is a perspective view of one embodiment of a portion of a wafer showing a plurality of generally rectangular regions in accordance with the invention.

FIG. 16 is a perspective view of a portion of a wafer 170. The wafer 170 has a generally planar upper surface and a plurality of generally rectangular regions 180 arranged in generally parallel rows 190, with each region 180 being shown bounded by dashed lines 191, 192. Each region 180 has an optical channel 150 and aperture structure 160. After all the processing steps for forming the read and write heads, and the optical channels 150 and aperture structures 160 in the manner described below, the wafer 170 is cut into rows 190 along planes represented by dashed lines 191, and the rows 190 then cut along planes represented by dashed lines 192, to form the individual sliders. The sliders are lapped, either at the row level or the individual slider level, along planes parallel to planes represented by dashed lines 191, to define the ABS. The wafer 170 has a thickness "t" which is the "length" of the individual sliders.

Figure 17:
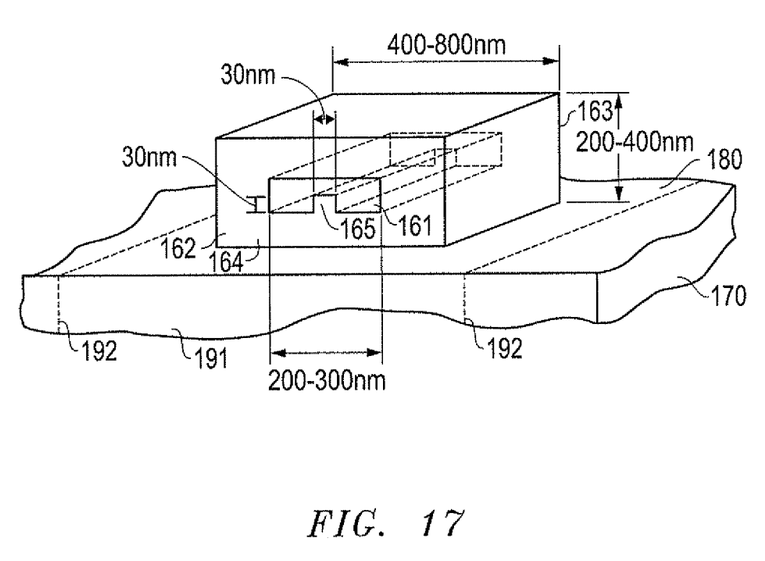
FIG. 17 is a perspective view of one embodiment of an aperture structure on a rectangular region of the wafer in accordance with the invention.

FIG. 17 is a perspective view, not to scale, of an aperture structure 160 on a rectangular region 180 of wafer 170. The aperture structure 160 includes the aperture 161 surrounded by metal 162, which may be a pure metal, such as Au or Cu, or an alloy of two or more metals, like a AuCu alloy. The aperture structure 160 has parallel faces 163, 164 that are generally parallel to the plane 191 along which the wafer will be cut into rows of rectangular regions. At faces 163 and 164, the aperture 161 has a generally C-shape defined by a ridge 165 of metal 162 that extends between faces 163 and 164.

FIG. 17 also shows one embodiment of dimensions for the aperture structure 160, which are meant to be merely representative of typical dimensions and do not limit the scope of the invention. The aperture structure 160 has a width parallel to plane 191 and to the "length" of rectangular region 180 of about 400 to 800 nm and a thickness of about 200 to 400 nm in the direction perpendicular to the wafer surface. The ridge 165 has a width of about 30 nm and a thickness of about 30 nm, with the characteristic dimension "d" of the C-shaped aperture being the width of ridge 165. The size of the ridge 165 and the characteristic dimension "d" essentially define the spot size of the radiation incident on the recording layer, and for the dimensions shown the areal bit density on the disk would be greater than about 1 Terabit/in$^2$.

Figure 1:
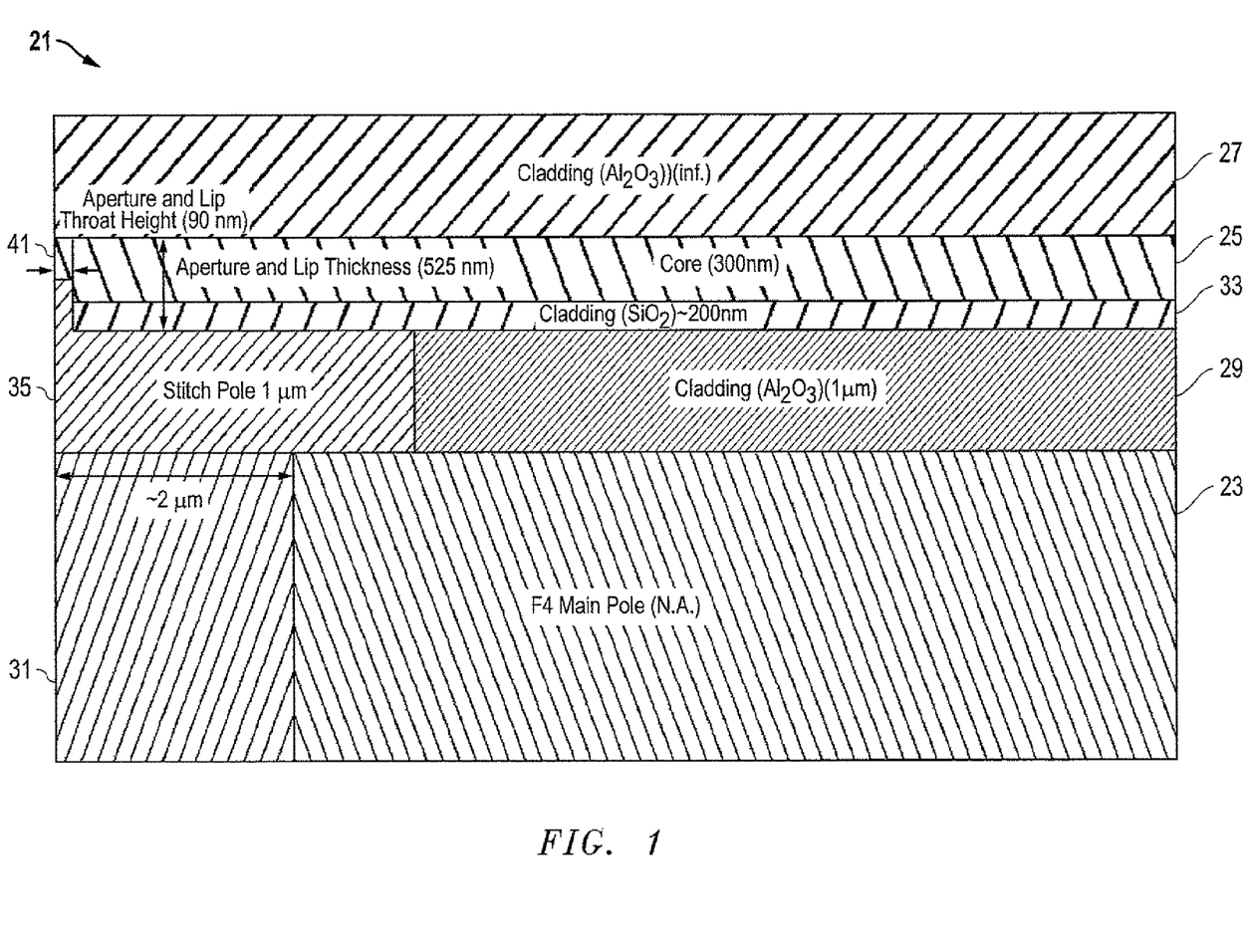
FIG. 1 is a schematic sectional side view of one embodiment of a thermal assisted recording (TAR) head for a hard disk drive, and is constructed in accordance with the invention.

FIG. 1 depicts an embodiment of a thermal assisted recording (TAR) head 21 for a hard disk drive. TAR head 21 comprises a main pole 23, a core 25 and cladding 27, 29, 31 formed thereon and therebetween. The cladding 27, 29, 31 may comprise $Al_2O_3$ having a thickness on the order of 1 to 2 μm. One embodiment of the core 25 has a thickness of about 300 nm and an aperture and lip thickness of about 525 nm. Another separate layer of cladding 33 (e.g., $SiO_2$) having a thickness of about 200 nm may be located between core 25 and cladding 29. TAR head 21 may further comprise a stitch pole 35 having a thickness of about 1 μm, and an aperture 41 having an aperture and lip throat height of about 90 nm, in one embodiment.

Figure 2:
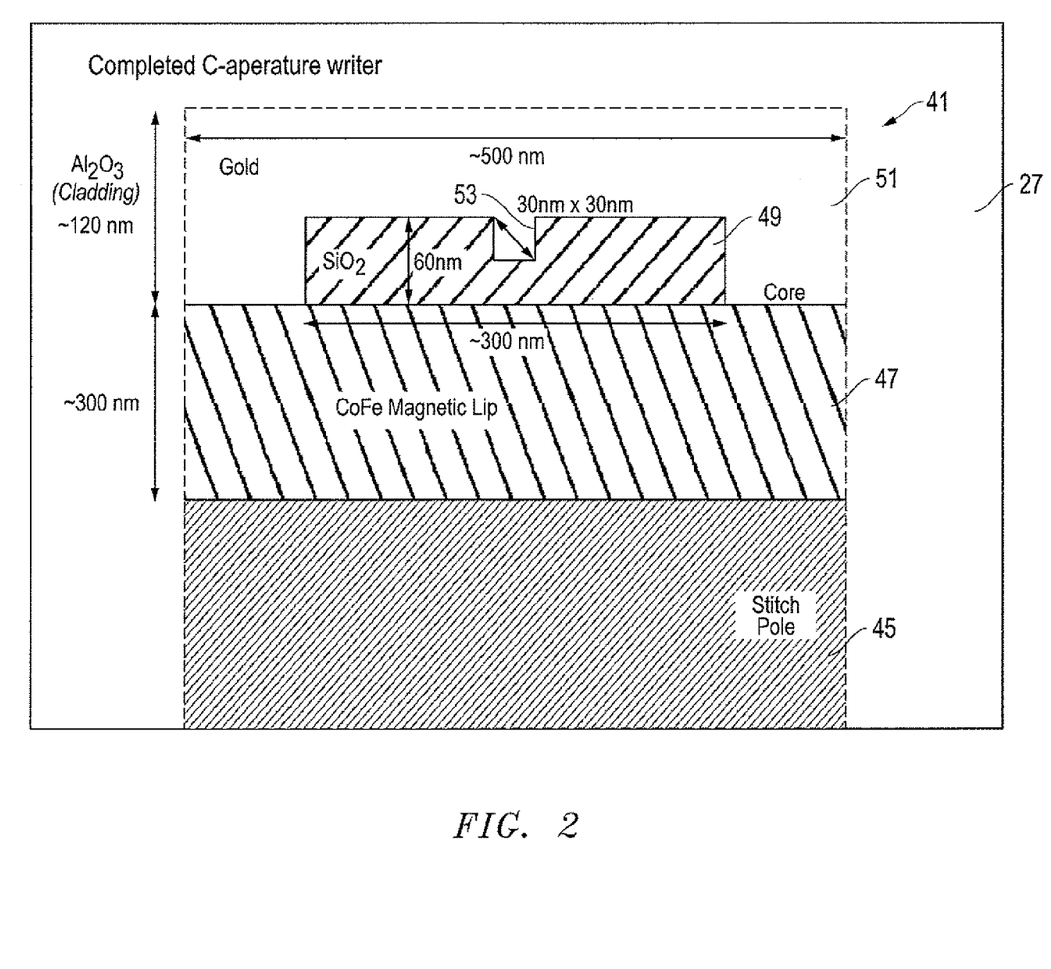
FIG. 2 is an enlarged schematic sectional air bearing surface (ABS) view of one embodiment of a c-aperture writer for the TAR head of FIG. 1, rotated 90 degrees, and is constructed in accordance with the invention.
Figure 3:
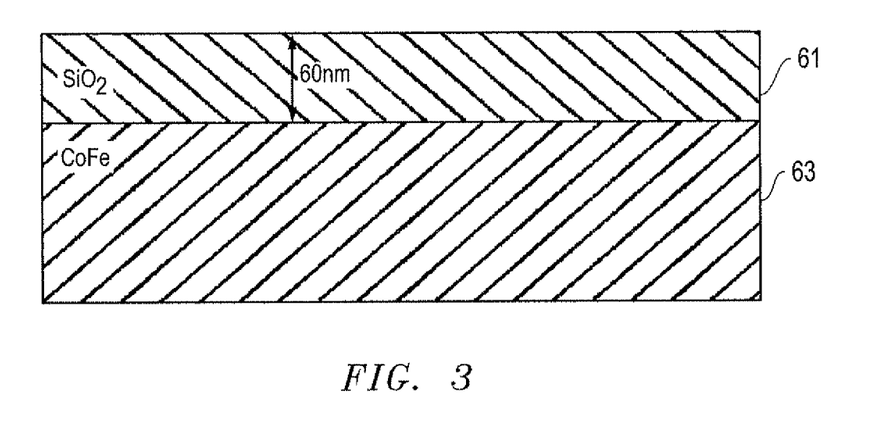
FIGS. 3-13 are schematic sectional and top views of various embodiments of a method of fabricating the c-aperture of FIG. 2, and are constructed in accordance with the invention.

FIG. 2 is an enlarged schematic sectional ABS view of one embodiment of the aperture 41. For example, aperture 41 may comprise a c-aperture or E-antenna writer. In the embodiment shown, aperture 41 comprises a substrate (e.g., formed from NiFe), a stitch pole 45, and a base layer or magnetic lip 47 which may be formed from a core of CoFe or similar magnetic material. An insulation layer 49 is formed on the magnetic lip 47, is encased in a conductive material 51, and has cladding 27. In some embodiments, the insulation layer 49 is formed from $SiO_2$, has a thickness of about 60 nm, and has a central rectangular notch 53 (e.g., 30×30 nm) formed therein opposite the magnetic lip 47. The conductive material 51 may comprise Au and have a width of about 500 nm. The thickness of magnetic lip 47 is about 300 nm, and conductive material 51 has a thickness of about 120 nm.

Figure 4:
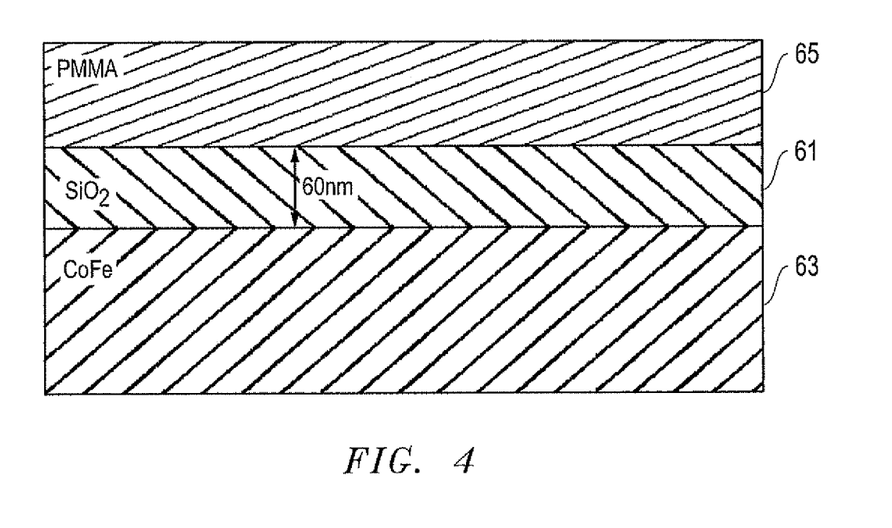
Figure 5:
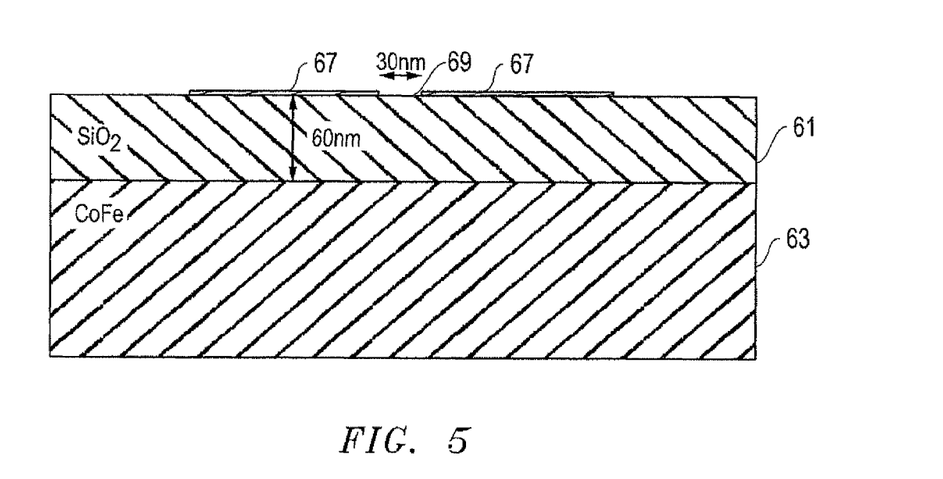
Figure 6:
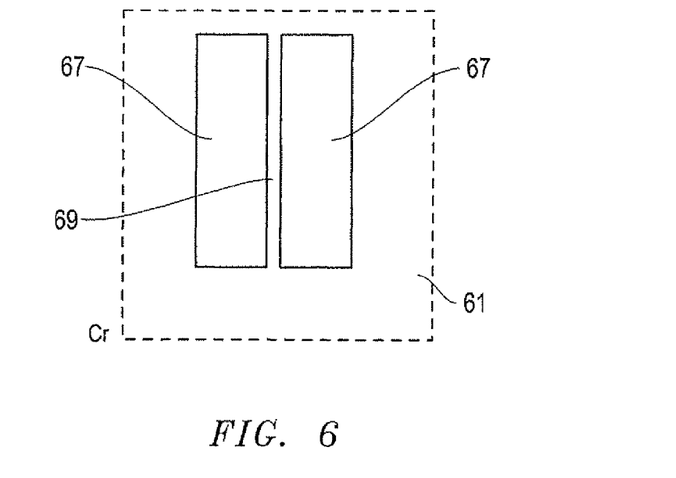

Referring now to FIGS. 3-13, schematic sectional and top views of various embodiments of a method of fabricating the aperture 41 depicted in FIG. 2 are shown. The method fabricates a plasmonic near field source for thermal assisted recording applications in, for example, hard disk drives. In one embodiment, the method initially comprises depositing an insulator 61 (which will ultimately be the insulation layer 49) on a "base layer" 63 (which will ultimately be the magnetic lip 47). As shown in FIG. 4, an e-beam resist layer 65 is applied on the insulator 61. FIGS. 5 and 6 depict sectional side and top views of e-beam lithography and liftoff on the e-beam resist layer to form a pair of parallel hard mask features 67 separated by a gap 69.

Figure 7:
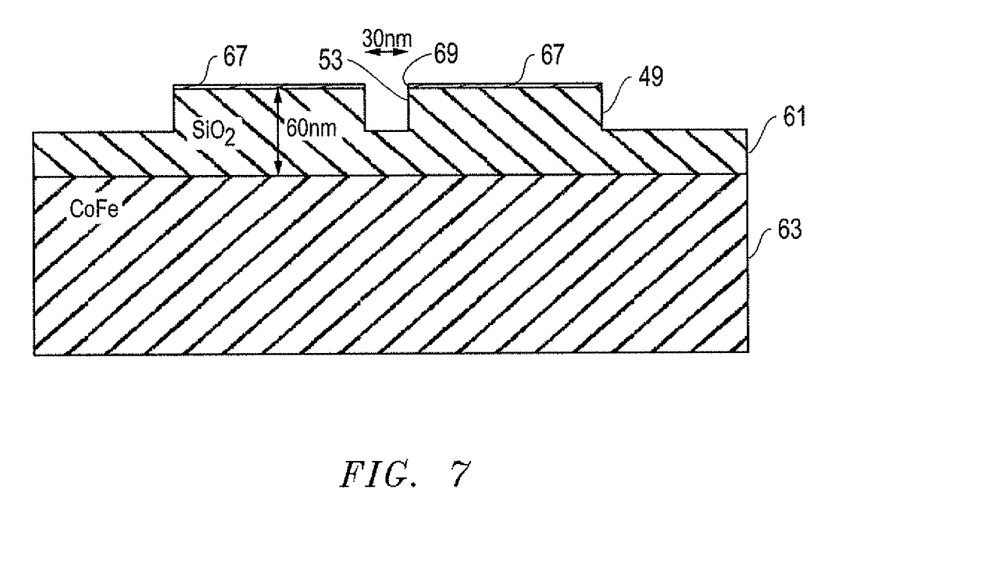
Figure 8:
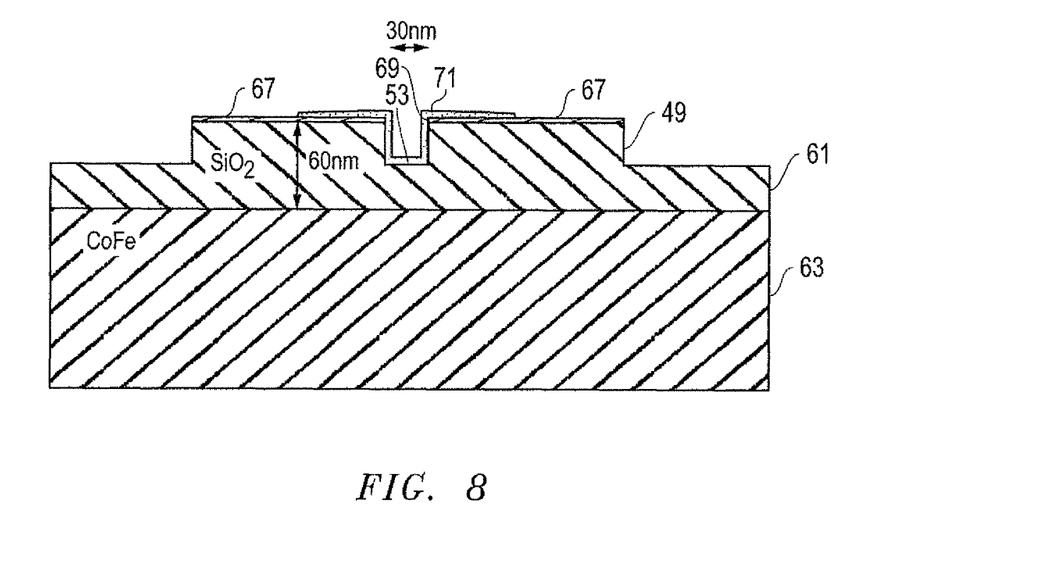
Figure 9:
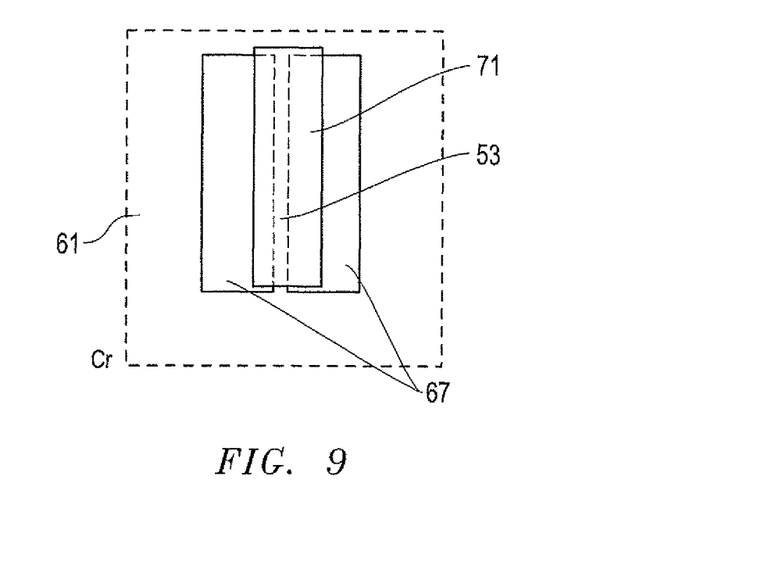

As shown in FIG. 7, the insulator layer 61 is then reactive ion etched (RIE) to form a notch 53 in the insulation layer 49 below the gap 69. The hard mask features 67 protect the insulator material beneath them from the RIE. Next, FIGS. 8 and 9 depict performing e-beam lithography and liftoff to add an additional hard mask 71 over the gap 69 and notch 53. Although this second e-beam step must be reasonably well-aligned to the first e-beam step, as shown in FIG. 9, the features 67 and 71 can be designed such that there is ample misalignment tolerance, making the alignment easy to achieve with existing e-beam tool capabilities. Specifically, feature 71 must completely protect the gap 69, but be narrower than the outer edges of feature 67. There is significant margin for vertical misalignment in FIG. 9, as most of the top and bottom of the features are subsequently removed (see FIG. 13).

Figure 10:
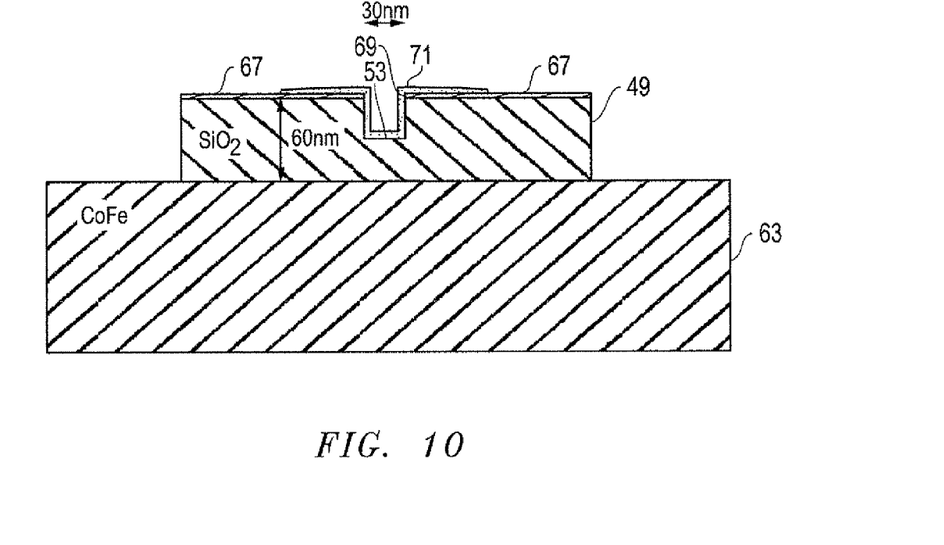

Referring to FIG. 10, another RIE is performed to completely remove all of the insulator layer not protected by either hard mask features 67 or 71. In another variation of this process, a thin layer of insulating material (e.g., less than 5 nm) may remain following this second RIE step. The advantage of leaving this insulating layer is that it may serve as a protective layer to avoid potential corrosion of the magnetic lip material 47. Leaving a small amount of insulating material would have little impact on the E-antenna performance. For example, see related U.S. patent application Ser. No. 12/347,084, titled Thermally Assisted Recording Head Having Recessed Waveguide with Near Field Transducer and Methods of Making Same; and U.S. patent application Ser. No. 12/347,194, titled Thermally Assisted Recording Head Having an Optical Waveguide and a Near Field Transducer with a Tuned Backedge; U.S. patent application Ser. No. 12/347,134, titled Thermally Assisted Recording Head Having an Electrically Isolated Magnetic Layer and a Near Field Transducer, which are incorporated herein by reference in their entirety.

Figure 11:
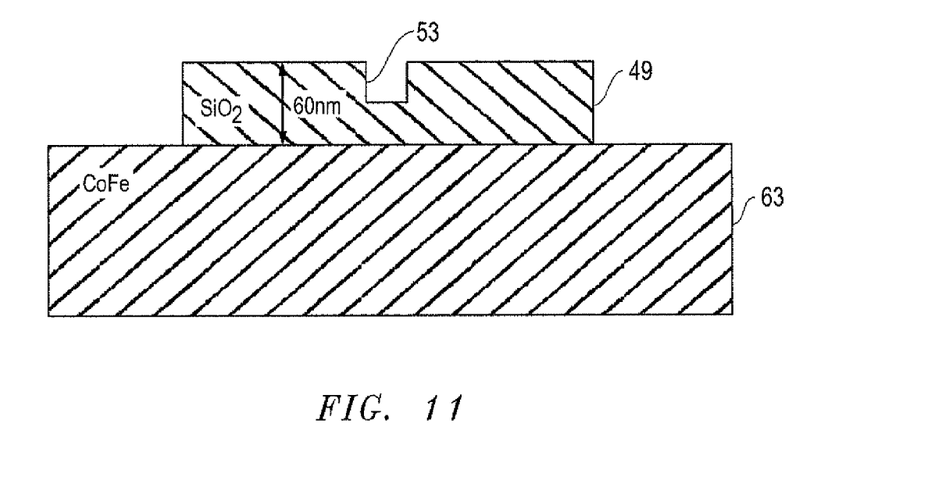
Figure 12:
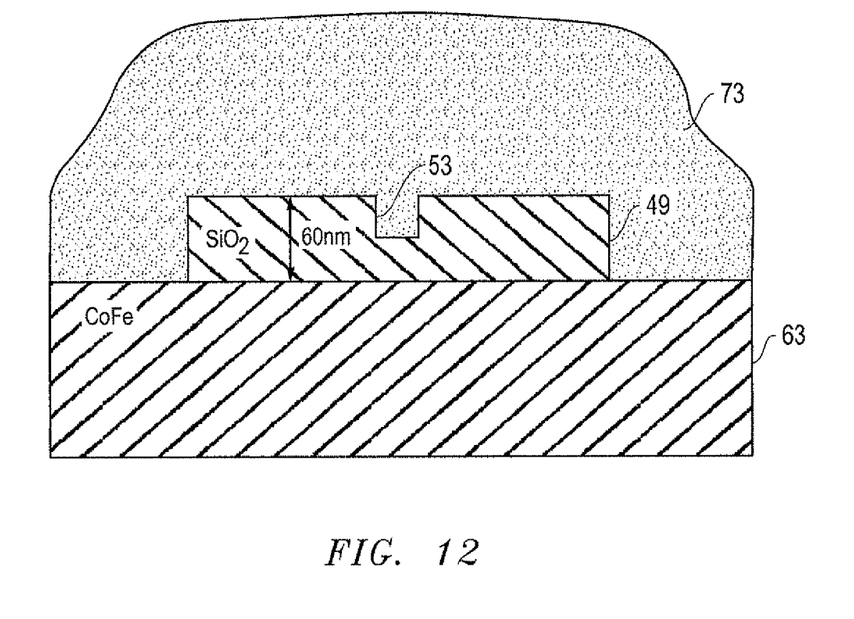

In FIG. 11, a wet chemical etch is used to remove the extraneous hard mask features 67 and 71, and then form a structure comprising only the insulation layer 49 on the base layer 63. As shown in FIG. 12, a conductive layer 73 is deposited on the structure 49, 63. As a result of this process, the notch 53 is exactly centered in aperture 49.

Figure 13:
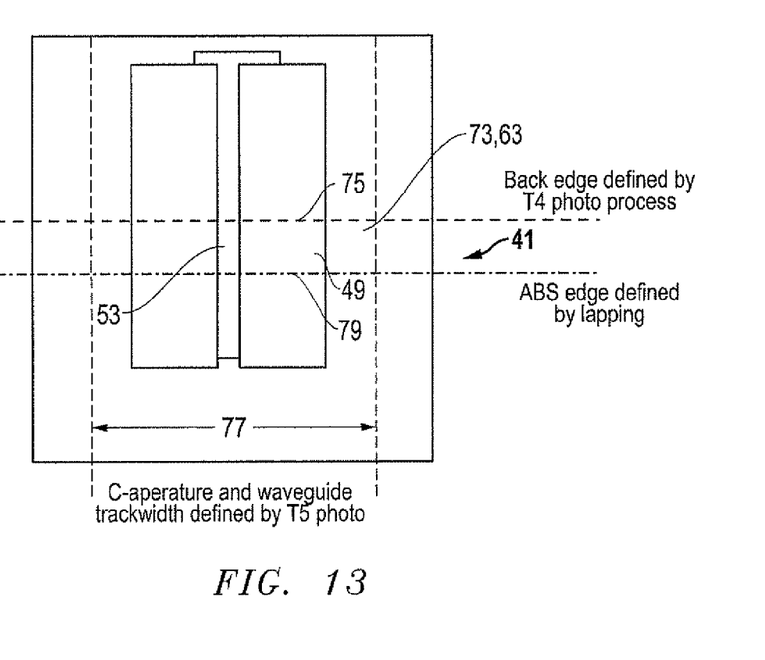

Finally, as shown in FIG. 13, a throat and trackwidth of the c-aperture 41 are formed from the structure 49, 63. This step may comprise defining a back wall 75 of the c-aperture and a waveguide trackwidth 77 by separate photolithography processes (e.g., labeled T4 and T5, respectively) on the structure. In the T4 and T5 processes, aligned photolithography creates a protective resist mask, ion milling removes extraneous material, and a solvent lift-off process removes the residue photoresist. The air bearing surface (ABS) edge 79 is defined by lapping the structure.

In some embodiments, the insulator layer is deposited as 60 nm of $SiO_2$ and the base layer is 300 nm of CoFe. The e-beam resist layer may comprise applying polymethylmethacrylate (PMMA) on the insulator layer. The liftoff steps may comprise using Cr liftoff, and forming the pair of hard mask features from Cr in rectangular shapes, with the gap having a width of approximately 30 nm. The thickness of the insulator layer may be reactive ion etched using $CF_4$, both outside of the pair of parallel features and in the gap. The second hard mask 71 also may comprise lift-off Cr. The wet etching step may comprise Cr etching, that does not attack either the base layer or the insulator, such that all of the Cr is removed and only the notched insulator layer and the base layer remain. The conductive layer step may comprise depositing approximately 120 nm of Au on the structure.

While the invention has been shown or described in only some of its forms, it should be apparent to those skilled in the art that it is not so limited, but is susceptible to various changes without departing from the scope of the invention.

What is claimed is:

1. A method of fabricating a plasmonic near field source for thermal assisted recording applications in hard disk drives, the method comprising:
   (a) depositing an insulator layer on a base layer;
   (b) applying an e-beam resist layer on the insulator layer;
   (c) depositing a hard mask layer on the e-beam resist layer, and performing e-beam lithography and liftoff on the e-beam resist layer to form a pair of parallel hard mask features separated by a gap;
   (d) reactive ion etching (RIE) the insulator layer to form a notch therein located below the gap;
   (e) performing e-beam lithography and liftoff to add a second hard mask over the gap;
   (f) reactive ion etching the pair of parallel hard mask features to define edges of a structure in the insulator layer;
   (g) wet etching the structure to remove extraneous hard mask material from the insulator layer;
   (h) depositing a conductive layer on the structure; and then
   (i) fabricating a throat of a c-aperture in the structure.

2. A method according to claim 1, wherein step (a) comprises depositing the insulator layer as $SiO_2$ and the base layer is CoFe.

3. A method according to claim 1, wherein step (b) comprises applying polymethylmethacrylate (PMMA) on the insulator layer.

4. A method according to claim 1, wherein the liftoff on the e-beam resist layer of step (c) comprises plating Cr into openings in the e-beam resist layer to form the pair of parallel hard mask features from Cr separated by the gap, and lifting off the e-beam resist layer.

5. A method according to claim 1, wherein step (e) comprises Cr liftoff wherein a formed Cr feature completely covers the notch, but is narrower than outer edges of the pair of parallel features.

6. A method according to claim 1, wherein step (d) comprises using $CF_4$ to reduce a thickness of the insulator layer outside the pair of parallel features and in the gap.

7. A method according to claim 1, wherein step (f) enables the notch to be exactly centered between the edges of the structure.

8. A method according to claim 1, wherein step (g) comprises wet Cr etching, such that only the notched insulator layer and the base layer remain.

9. A method according to claim 1, wherein step (h) comprises depositing Au on the structure.

10. A method according to claim 1, wherein step (i) comprises defining a back wall of the c-aperture and a waveguide trackwidth by photoresist processes on the structure, and defining an air bearing surface (ABS) edge by lapping the structure.

11. A method of fabricating a plasmonic near field source for thermal assisted recording applications in hard disk drives, the method comprising:
   (a) depositing an insulator layer on a base layer;
   (b) applying an e-beam resist layer on the insulator layer;
   (c) performing e-beam lithography and Cr liftoff on the e-beam resist layer to form a pair of parallel hard mask features from Cr in rectangular shapes separated by a gap;
   (d) reactive ion etching (RIE) the insulator layer to form a notch therein located below the gap;
   (e) performing e-beam lithography and Cr liftoff to add a second hard mask over the gap, wherein a formed Cr feature completely covers the notch, but is narrower than outer edges of the pair of parallel hard mask features;
   (f) reactive ion etching the insulator layer around the pair of parallel hard mask features to define edges of a structure;
   (g) wet etching the structure to remove extraneous hard mask material from the insulator layer;
   (h) depositing a conductive layer on the structure; and then
   (i) fabricating a throat of a c-aperture in the structure by defining a back wall of the c-aperture and a waveguide trackwidth by photoresist processes on the structure, and defining an air bearing surface (ABS) edge by lapping the structure.

12. A method according to claim 11, wherein step (a) comprises depositing the insulator layer as $SiO_2$ and the base layer is CoFe, and step (b) comprises applying polymethylmethacrylate (PMMA) on the insulator layer.

13. A method according to claim 11, wherein step (d) comprises using $CF_4$ to reduce a thickness of the insulator layer outside the pair of parallel features and in the gap.

14. A method according to claim 11, wherein step (f) enables the notch to be exactly centered between the edges of the structure.

15. A method according to claim 11, wherein step (g) comprises wet Cr etching, such that only the notched insulator layer and the base layer remain.

16. A method according to claim 11, wherein step (h) comprises depositing Au on the structure.

\* \* \* \* \*